United States Patent
Hoelsaeter et al.

(10) Patent No.: US 6,735,042 B2
(45) Date of Patent: May 11, 2004

(54) TAPE CARTRIDGE LIFTING DEVICE

(75) Inventors: Haavard Hoelsaeter, Oslo (NO); Truls Simensen, Hagan (NO)

(73) Assignee: Tandberg Data ASA, Oslo (NO)

( * ) Notice: Subject to any disclaimer, the term of this patent is extended or adjusted under 35 U.S.C. 154(b) by 171 days.

(21) Appl. No.: 10/052,827

(22) Filed: Nov. 7, 2001

(65) Prior Publication Data

US 2003/0086202 A1 May 8, 2003

(51) Int. Cl.$^7$ ................................ G11B 15/68
(52) U.S. Cl. .................................. 360/92; 360/92
(58) Field of Search .................. 360/92; 369/30.43, 369/30.45, 30.68, 30.67

(56) References Cited

U.S. PATENT DOCUMENTS 4,601,386 A   7/1986 Antonello

FOREIGN PATENT DOCUMENTS

| EP | 0 547 757 A2 | 6/1993 |
| EP | 0 987 701 A1 | 3/2000 |
| JP | 7-68444 | 3/1995 |
| JP | 2001-250310 | 9/2001 |

*Primary Examiner*—Brian E. Miller
(74) *Attorney, Agent, or Firm*—Schiff Hardin LLP

(57) ABSTRACT

A lifting apparatus for magnetic tape cartridges in a tape transport system or tape autoloader has a lifting platform supported by threaded lead screws. The threaded lead screws extend through threaded nuts held in the platform by floating mountings. A preferred embodiment has three lead screws and three types of floating mountings. The first restricts lateral and rotational motion, the second restricts rotational motion and lateral motion in one direction while permitting motion in a transverse direction, and the third floating mounting permits rotational and lateral motion, to a limited extent. A toothed belt over cog wheels drives the threaded lead screws to move the platform vertically.

10 Claims, 4 Drawing Sheets

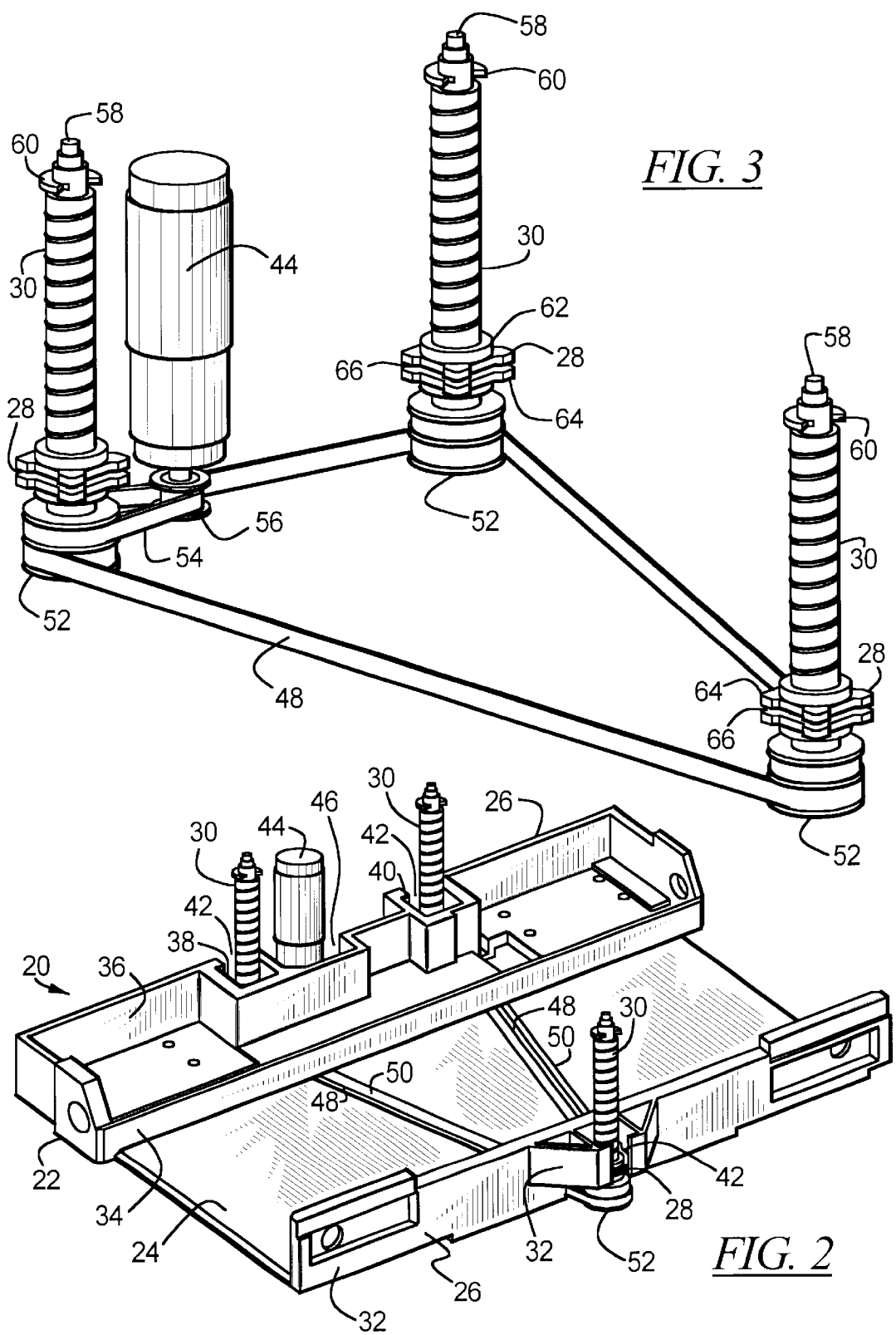

TAPE CARTRIDGE LIFTING DEVICE

BACKGROUND OF THE INVENTION

1. Field of the Invention

The present invention relates generally to a lifting device and, in particular, to a lifting device for lifting tape cartridges in a cartridges transport system for transport between a storage magazine and a tape streaming device.

2. Description of the Related Art

Date storage and data backup on magnetic tape often requires the use of multiple tape cartridges. These multiple tape cartridges are selectively inserted into and removed from tape streaming device, also referred to as tape recording and playback devices. The utilization of multiple tape cartridges is required for expanded data storage and/or storage of the data from different data backup events. For example, a data backup plan may provide for the use of a different tape for each day of the seek.

Implementation of multiple tape cartridge storage has required a service technician to change the cartridges from the tape streaming device, store the cartridges, and log the event to ensure that the proper cartridge is used at the proper time. Failure on the part of the service technician to change the cartridge at the right time or to use the correct cartridge can result in a failure of the data storage or backup plan.

The increase in data file size and the increased numbers of data files to be stored on a data storage system along with the increased dependance on data is an electronic format has lead to a greater need for reliable high capacity data storage and backup.

SUMMARY OF THE INVENTION

The present invention provides a lifter in a transport apparatus for cartridges for automated transfer of tape cartridges between cartridge storing locations and tape streaming devices.

The present invention provides a compact apparatus for transport of a tape cartridge between a tape streaming device and a tape cartridge storage magazine.

The present apparatus provides automated loading, unloading and storage of tape cartridges between multiple storage tape streaming devices and multiple storage locations.

These and other advantages of the present invention are provided in a lifting apparatus having a platform for supporting a cartridge, threaded nuts held in floating supports in the platform, threaded screws through the threaded nuts, and a drive for rotating the threaded screws about their respective axes. The floating supports of the threaded nuts hold the nuts in varying degrees of freedom. For example, one floating support restrains a first nut from lateral and rotational motion, another floating support restrains a second nut from rotational motion and permits motion in one lateral direction, and a third floating support permits both limited rotational and lateral motion of the third nut. This mounting of the threaded nuts prevents binding or jamming and permits a wider range of tolerances to be used in the manufacture of the cartridge transport apparatus.

The floating mounting of the threaded nuts permits the transport system to be of a minimum height, as elongated bearing supports along the length of the threaded screws are not required to prevent jamming and binding of the lifting apparatus. The present lifting device provides maximum utilization of the available height for vertical transport of the cartridge.

A further advantage is that inaccurate synchronization of the threaded screws does not result in jamming of the lifting apparatus. The floating mounting compensates for variations of screw alignment, screw rotation, vibration and shock, and wear to permit the tape transport apparatus to continue working. Lower manufacturing and assembly tolerances also permit the manufacture of the transport apparatus at lower costs.

BRIEF DESCRIPTION OF THE DRAWINGS

FIG. 2 is a perspective view of in a cartridge support platform and an arrangement of threaded lead screws and a drive for lifting according to the principles of the present invention;

FIG. 3 is a perspective view of the threaded lead screws and the drive of FIG. 2;

DETAILED DESCRIPTION OF THE PREFERRED EMBODIMENTS

Figure 1:
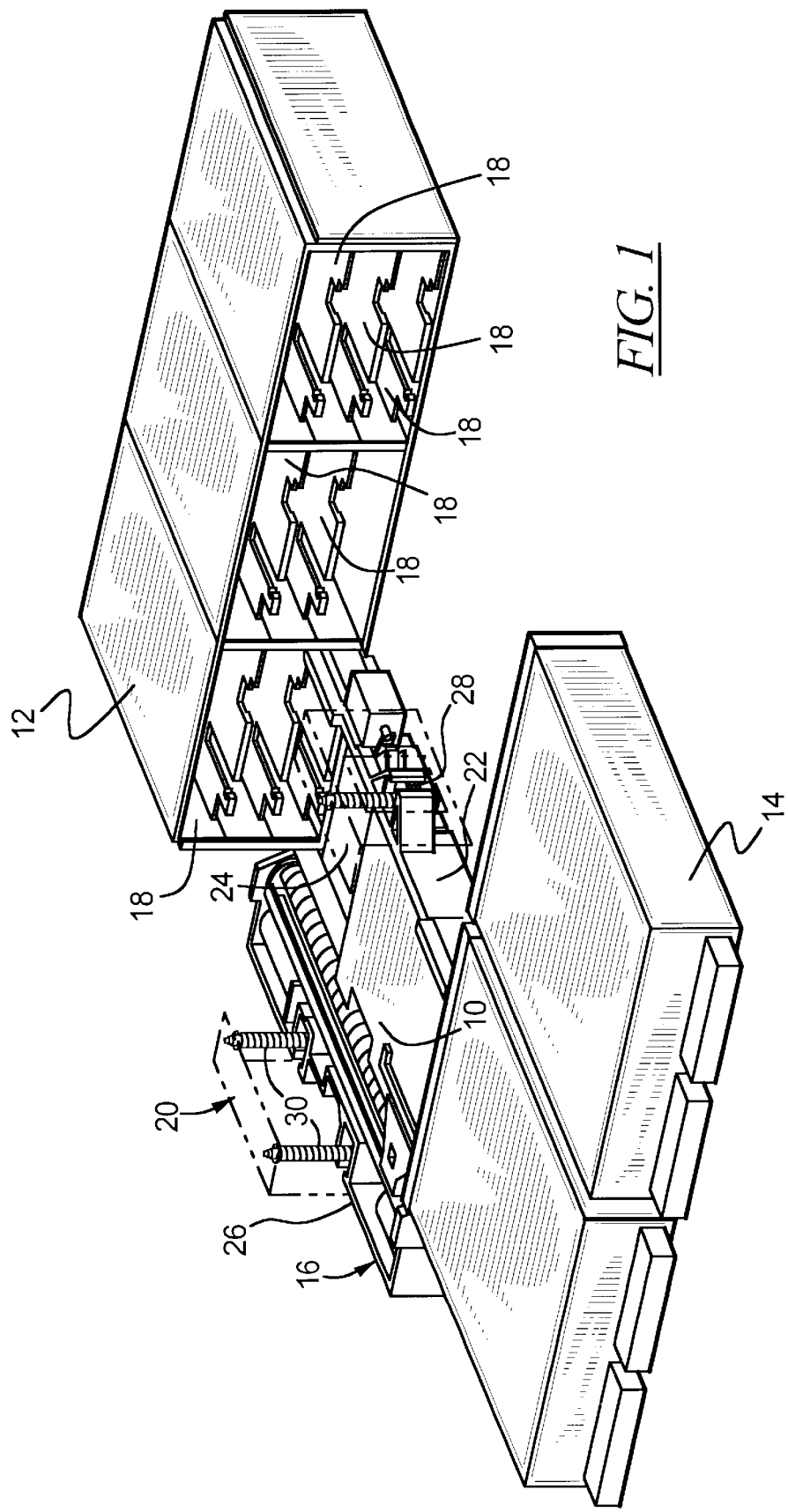
FIG. 1 is a perspective view of a tape cartridge transport apparatus for transport of a tape cartridge between multiple storage locations in a storage magazine and multiple tape streaming devices.

In FIG. 1, a magnetic tape cartridge 10 for storing computer data or the like is being transported between a storage magazine 12 and tape streaming devices 14, such as magnetic tape recording and playback devices, by a cartridge transport apparatus 16. The storage magazine 12 has a plurality of storage slots 18 in which the tape cartridge 10 may be stored, or more accurately in which a like plurality of tape cartridges 10 are stored. The transport apparatus 16 moves between the storage slots 18 to remove tape cartridges therefrom and to insert the tape cartridges thereinto as the cartridges are moved to and from the tape streaming devices 14. Some of the storage slots 18 are arranged one above the other, while others are arranged side-by-side. A cartridge lifting apparatus 20 according to the present invention is provided to move the cartridges 10 vertically for access to the vertically disposed storage slots 18. Other transport means is provided to move the cartridge between the side-by-side storage slots and for transport of the cartridge over the distance between the tape streaming devices 14 and the storage magazine 12, as is disclosed in co-pending U.S. patent application Ser. No. 10/045,369, filed Nov. 9, 2001, which is incorporated herein by reference. The tape transport apparatus is also referred to as an autoloader.

To support the tape cartridge 10 during transport, the cartridge lifting apparatus 20 of the present invention includes a platform 22. The platform 22 has a cartridge support surface 24 on which the cartridge 10 rests during transport. The support surface 24 is supported by a frame 26 and the frame 26 holds threaded nuts 28 through which extend threaded lead screws 30. The threaded lead screws 30 are disposed with their axes extending parallel to one another and in the direction along which the cartridge 10 is to be moved. In the illustrated embodiment, the lead screws 30 extend vertically.

The cartridge 10 is moved up and down in a vertical direction by the operation of the present lifting apparatus 20. By movement of the platform 22 in a vertical direction, it is possible to access tape cartridges 10 in the storage slots 18 that are disposed above one another so that the cartridges can be removed from the slots 18 or inserted thereinto. Although the tape streaming devices 14 of FIG. 1 are shown side-by-side, the present lifting apparatus may be used to access tape streaming devices disposed above one another. The present invention is, of course, applicable to movement in a direction other than vertical, and may be used for horizontal movement, or movement along a diagonal.

A feature of the present invention is that the vertical lifting apparatus 20 occupies only a slightly greater height than the range of vertical movement required by the cartridge transport.

FIG. 2 shows the lifting apparatus 20 with the platform 22 and the vertically disposed lead screws 30. Three threaded lead screws 30 are provided in the preferred embodiment, two on one side of the cartridge support surface 24 and one on the opposite side thereof. The platform 22 is supported solely by the threaded lead screws 30. The threaded lead screws 30 are arranged symmetrically relative to the longitudinal direction of the platform 22, the cartridge support surface 24 extending longitudinally as well. The cartridge 10 is slid longitudinally along the cartridge support surface 24 during transport between the tape streaming devices 14 and the storage magazine 12 by an apparatus disclosed in further detail in the co-pending U.S. patent application Ser. No. 10/045,369, filed Nov. 9, 2001. Such sliding movement results in a shift in the weight distribution along the platform 22, tending to cause tilting of the platform 22 and binding of the lifting apparatus. The present lifting apparatus, however, overcomes this tendency by a floating mounting of the threaded nuts 28 that engage the lead screws 30.

The platform 22 of the present invention, in addition to having the cartridge support surface 24, also includes the frame 26 made up of a side wall 32 and an abutting wall 34, both extending longitudinally to define a channel along which the tape cartridge 10 slides. A wall 36 defines an opposite side of the platform 22. The side wall 32 includes a formed bracket 38 extending from the side wall 32 in a direction opposite the tape cartridge channel, the bracket 38 holding the threaded nut 28 through which the threaded lead screw 30 extends. The wall 36 also includes brackets 38 and 40 holding threaded nuts, the brackets 38 and 40 extending into the body of the platform 22 rather than extending beyond the wall as does the bracket 32. The brackets 32, 38 and 40 each define rectangular passageways 33, 39 and 41 extending vertically through the platform 22. Each of the passageways 33, 39 and 41 is open in a lateral direction at a gap 42.

The lead screws 30 are rotationally driven substantially in unison by a motor 44. The motor 44 is disposed in a clearance space 46 in the platform 22 to permit the platform 22 to move free of the motor 44. The motor 44 is mounted on the brackets of the lifting apparatus 20. Rotational motion by the motor 44 is conveyed to the threaded screws 30 by a belt 48, visible in clearance slots 50 in the cartridge support surface 24. The belt 48 extends around a pulley 52 at the base of the threaded screws 30.

Referring now to FIG. 3, the platform is removed to reveal the belt 48 extending about the pulleys 52 of all three of the threaded screws 30. The motor 44 also has a belt 54 on a pulley 56 which extends to one of the pulleys 52. The pulleys 52 are two level pulleys having side by side channels for the belts 48 and 54. Although only one of the threaded lead screws 30 requires the two level pulley 52, the use of uniformly configured parts simplifies assembly. For example, it permits any of the threaded screws 30 to be placed into any position during assembly, thereby reducing the chance of errors in manufacture. The belts 48 and 54 are preferably toothed belts, or cog belts, and the pulleys 52 and 56 are preferably cogwheels for positive rotation with the toothed belts. The motor 44 of a preferred embodiment is a DC motor. In particular, an electric motor with a tach-generator feedback is provided.

The threaded lead screws 30 rotate about their respective axes under operation of the motor 44 to cause the threaded nuts 28 to move axially of the threaded screws 30. The lead screws 30 each include an axil 58 fixed in a bracket shown in phantom in FIG. 1 and about which the screws 30 rotate. The axils 58 are held in place in the bracket by clips 60.

The threaded nuts 28 have a threaded sleeve portion 62 engaging the threaded screws 30. The threaded nuts 28 also have a generally square portion 64 defining four corners. A transverse slot 66 within the portion 64 provides a spring receiving space for the floating mounting.

Figure 4:
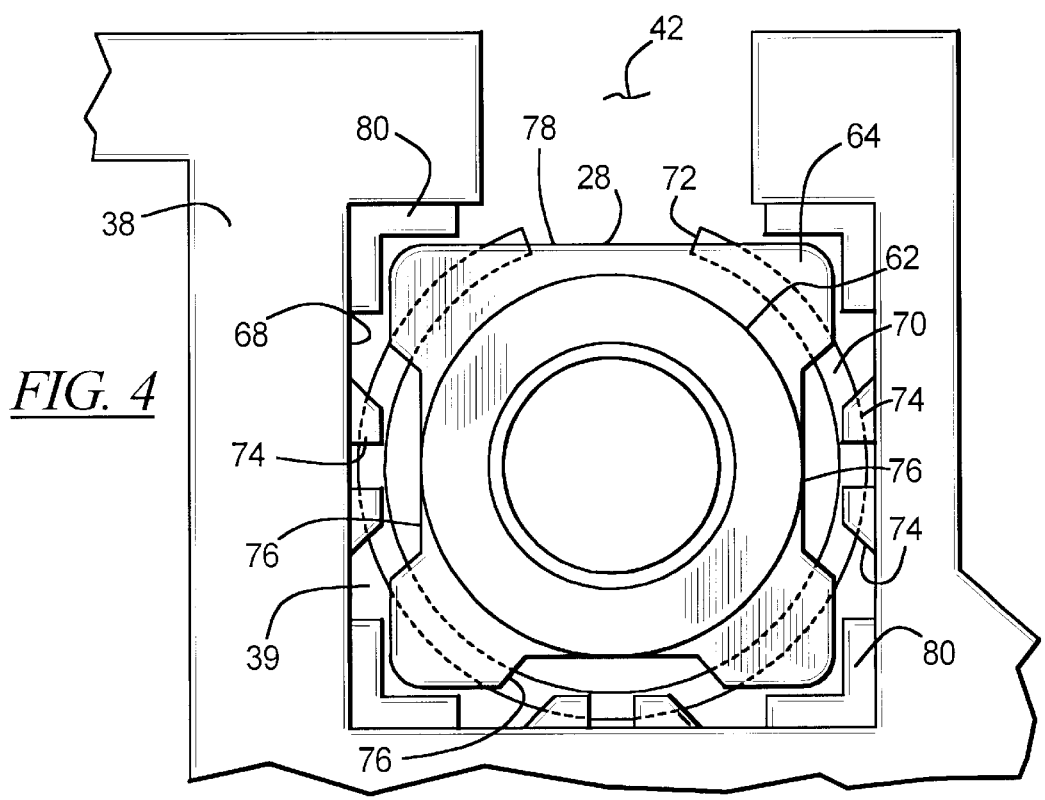
FIG. 4 is an enlarged plan view of a threaded nut for engagement in a first floating mounting on a threaded lead screw according to the present invention.

The floating mounting for the threaded nut 28 is shown in greater detail in FIG. 4. The nut 28 is in the passage 39 of the platform 22 and is spaced from the vertically extending walls 68 of the platform. A circular spring 70 with a gap 72 is mounted in the transverse slot 66 in the nut 28. The circular spring 70 is held in spring engagement tabs 74 that extend from the walls 68. In the illustrated embodiment, the spring engagement tabs 74 are in pairs on top of the spring 70 and a single tab below the spring 70 in the gap between the top tabs relative to the view of FIG. 4. This arrangement of the spring engagement tabs 74 holds the spring 70 in place, permits the spring 70 to flex for the floating mounting, and is easily molded in the manufacturing process.

The threaded nut 28 has clearances 76 for the spring engagement tabs 74. The clearances 76 are formed in the sides of the square portion 64, yet leave the corners of the square portion 64 projecting outward. Three such clearances 76 are provided in the threaded nut 28. A fourth side 78 of the square portion 64 extends straight without a clearance indentation. This straight fourth side is aligned with the gap 42 in the passage 39.

The walls 68 of the passageway 39 are provided with restricting portions 80 at each corner. The restricting portions 80 are of an L shape in the view of FIG. 4 and extend from the walls 68 to contact, or nearly contact, the corners of the square portion 64. Four such restricting portions 80 are at the four respective corners of the square portion 64. These L-shaped restricting portions prevent rotation and prevent lateral linear movement of the threaded nut 28 in the passageway 39, while still permitting some flexing of the nut 28 in position. The nut 28 is thereby held in a floating mounting, but with limitations on rotational or linear movement.

Figure 5:
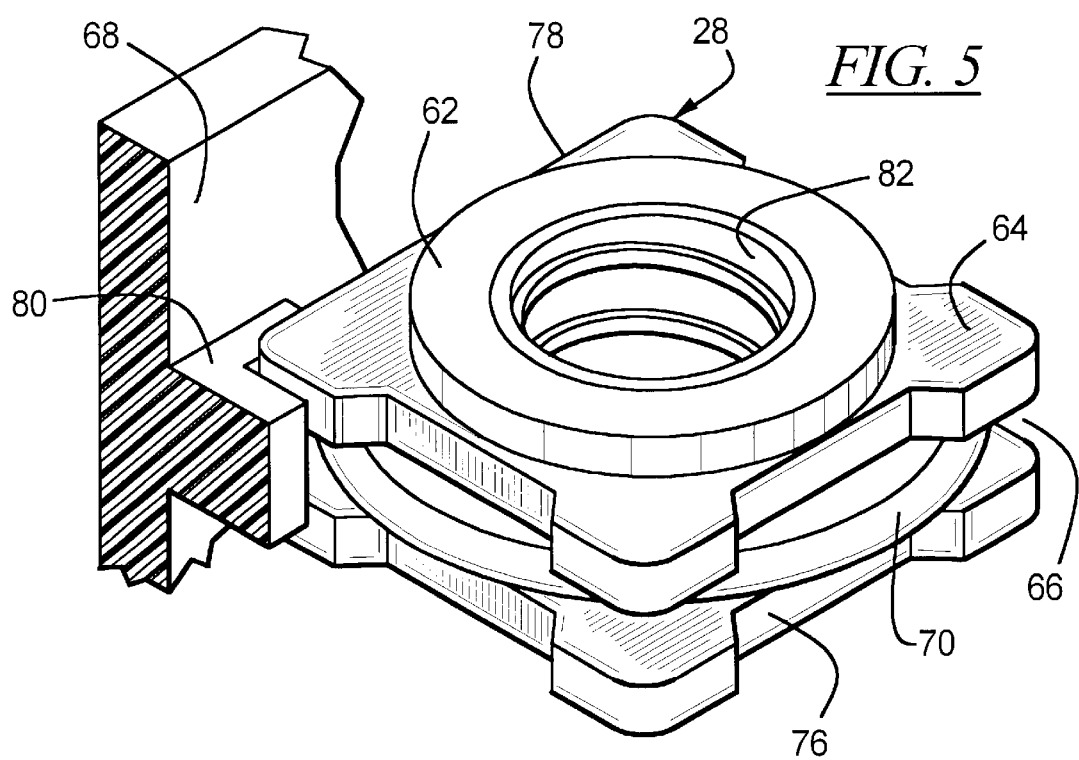
FIG. 5 is an enlarged perspective view, partially broken away, of a threaded nut in a floating mounting of FIG. 4.

FIG. 5 shows a perspective view of the threaded nut 28 and a portion of the wall 68 of the passageway 39. The sleeve 62 can be seen extending a slightly greater axial extent than the square portion 64. The interior bore 82 of the sleeve 64 is threaded for engagement on the threaded screws 30. The circular spring 70 is seen in the gap 66 in the threaded nut 28 and is extending from the clearances 76 at the sides of the square portion 64. The L-shaped restricting portion 80 is shown abutting the corner of the square portion 64. In the illustrated embodiment, the restricting portion 80 extends a lesser axial extent that the threaded nut 28, and considerably less than the side wall 68 of the passageway 39.

Figure 6:
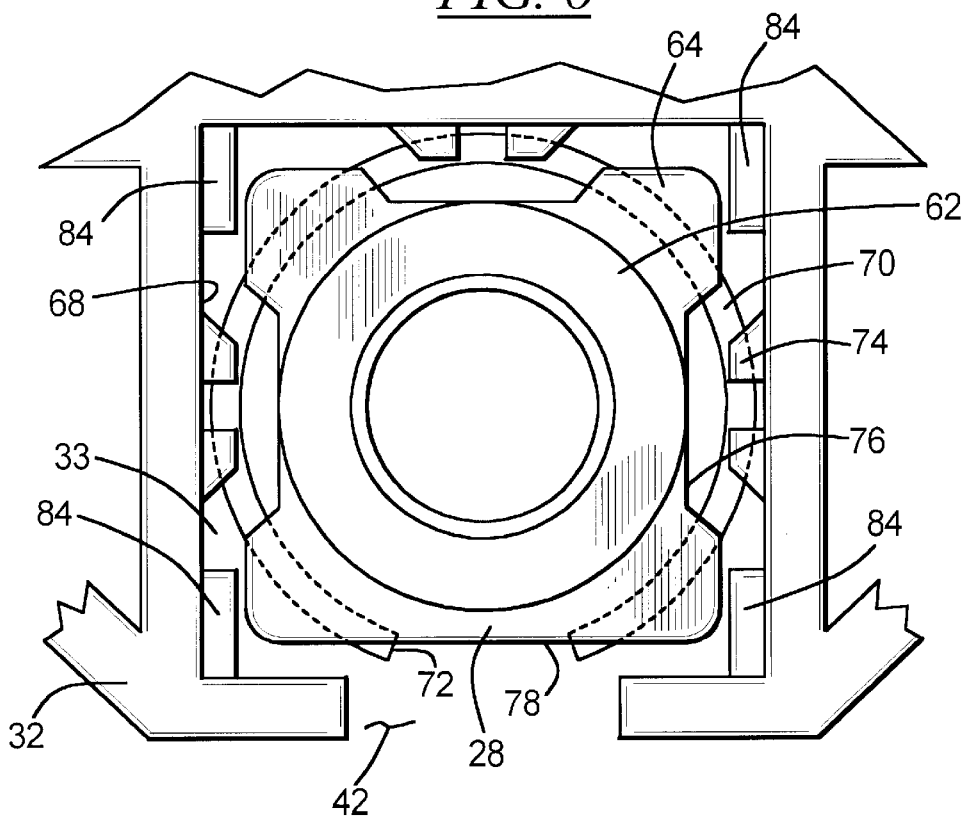
FIG. 6 is an enlarged plan view of a threaded nut in a second floating mounting.

In FIG. 6, the passageway in the bracket 32 is shown, wherein the threaded nut 28 is mounted in a floating mounting that provides a further degree of freedom compared to the mounting shown in FIGS. 4 and 5. Specifically, the threaded nut 28 is supported on the circular spring 70 that is held in the tabs 74 on the side walls 68 of the passageway 33. The corners of the square portion 64 abut, or nearly contact, restricting portions 84. The restricting portions 84 are on opposite parallel side walls 68 of the passageway 33, but no restricting portions are on the perpendicular walls. Four such restricting portions are provided at the four corners of the square portion 64. The effect is to restrict lateral linear movement in one direction, restrict rotational movement, yet permit linear lateral movement in a perpendicular direction. In other words, movement is not possible along the x axis, but is possible along the y axis.

Figure 7:
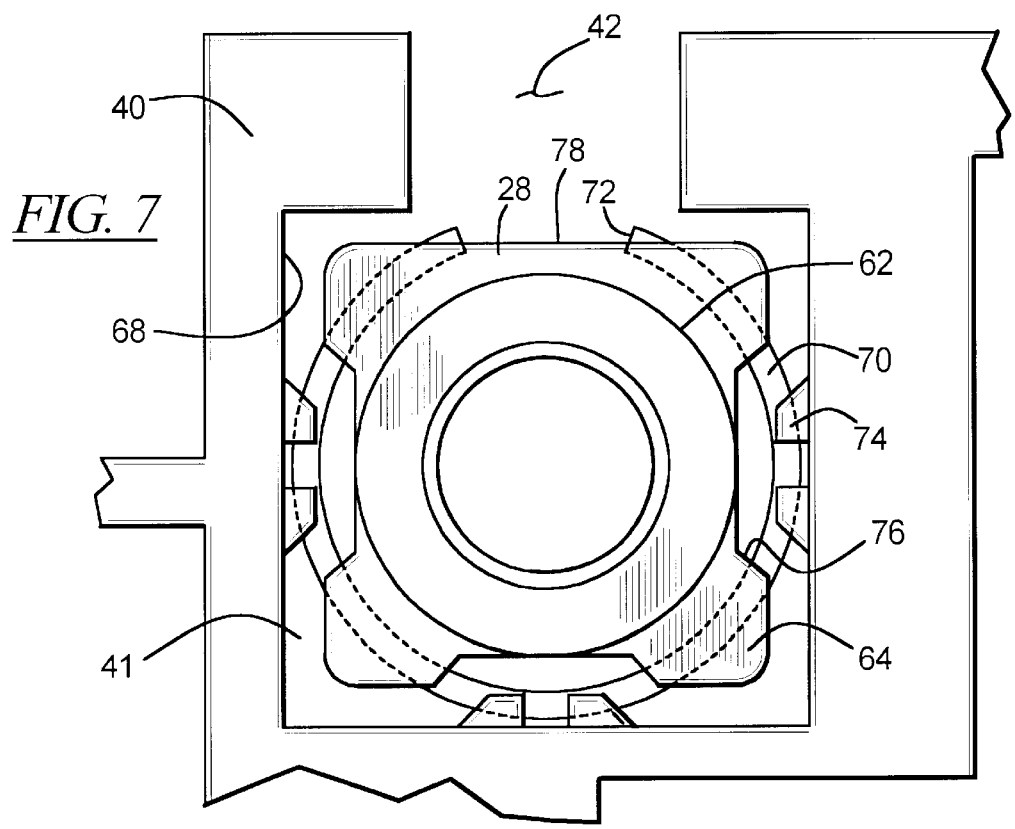
FIG. 7 is an enlarged plan view of a threaded nut in a third floating mounting.

Referring to FIG. 7, the third threaded nut 28 is mounted in a floating mounting with further degrees of freedom. In particular, the nut 28 is held by the circular spring 70 in the tabs 74 at the side walls 68 of the passageway 41. The corners of the passageway 41 have no restricting portions in contact with the corners of the square portion 64. The floating mounting of this threaded nut 28 permits limited rotational movement of the nut as well as limited lateral linear movement in both the x and y directions.

By mounting the threaded nuts 28 in floating mountings of varying degrees of freedom, jamming of the platform in its vertical travels is prevented. The threaded nuts 28 provide a complete support for the platform, no other guides or supports are necessary. The lifting system is resistant to shock, vibrations and other disturbing forces. Proper lifting operation is provided even if the synchronization of the lead screws is inaccurate or have different tolerances.

The first threaded nut 28 of FIG. 4 which is restricted in linear and rotational movement defines the origin of the movement. The second nut mounting of FIG. 6 permits linear movement in one x or y direction, but not the other, and is restricted from rotational movement. The third nut mounting of FIG. 7 permits limited x and y linear motion and rotational motion and defines the ground plane of the system. Although particular floating mountings are shown at particular locations on the platform, it is contemplated that the different floating mountings may be in a different arrangement or that different numbers of each degree of freedom mounting may be provided. For example, two full freedom mountings as in FIG. 7 could be provided in an embodiment having four lead screws.

If the toothed belt 48 has some slack, the platform 22 can tilt, but the floating mounting of the nuts prevents jamming of the system. A difference in rotation of the lead screws 30 must be quite large to produce a remarkable tilt in the platform 22. The tilt angle based on rotation difference of the lead screws is calculated from the formula:

$$\phi = \arctan(a \cdot s/360)/(d),$$

wherein $\phi$ is misalignment angle, a is difference in rotation angle s is lead on lead screws, and d is distance between the lead screws.

The present apparatus is very tolerant of large tolerance variations and small misalignments in the parts. This makes the apparatus flexible and suitable for volume production, while also providing reliable operation.

The present lifting apparatus has a very low height requirement to achieve lifting, particularly due to the minimum bearing height that is possible. The present lifting apparatus is useful in various configurations of cartridge handling and loading systems and for use with various types of tape drives.

Although other modifications and changes may be suggested by those skilled in the art, it is the intention of the inventors to embody within the patent warranted hereon all changes and modifications as reasonably and properly come within the scope of their contribution to the art.

We claim:

1. A tape cartridge lifting device, comprising:
   a platform for supporting a tape cartridge;
   first, second and third threaded nuts held in said platform;
   first, second and third threaded screws in corresponding ones of said first, second and third threaded nuts, said first, second and third screws being rotationally supported and being substantially parallel to one another;
   a drive for selectively rotating said first, second and third threaded screws substantially in unison to move said platform in an axial direction of said first, second and third screws, said first threaded nut being held in a floating mounting in said platform but being restrained from linear and rotational movement;
   said second threaded nut being held in a floating mounting in said platform but being restrained from rotational movement, said floating mounting of said second threaded nut permitting linear movement of said second threaded nut relative to said platform; and
   said third threaded nut being held in a floating mounting in said platform, said floating mounting of said third threaded nut permitting linear and rotational movement relative to said platform.

2. A tape cartridge lifting device as claimed in claim 1, wherein said floating mounting of said first, second and third threaded nuts in said platform includes split rings between respective ones of said first, second and third threaded nuts and said platform.

3. A tape cartridge lifting device as claimed in claim 2, wherein said first, second and third threaded nuts are substantially identical to one another.

4. A tape cartridge lifting device as claimed in claim 2, wherein said first, second and third threaded nuts include a circumferentially extending channel in which said split ring engages.

5. A tape cartridge lifting device as claimed in claim 2, wherein said first, second and third threaded nuts each have radical projections, and wherein said platform includes portions abutting said radial projections of said first threaded nut to restrain said first threaded nut from linear and rotational movement; and
   said platform including portions abutting said radial projections of said second threaded nut to restrain said second threaded nut from rotational movement.

6. A tape cartridge lifting device as claimed in claim 1, wherein said drive includes a motor and a toothed belt extending from said motor to at least one of said first, second and third threaded screws.

7. A tape cartridge lifting device as claimed in claim 1, wherein said first, second and third threaded screws include cogwheels, and said drive includes a cog belt in engagement with said cogwheels of said first, second and third threaded screws to rotate said first, second and third screws substantially in unison.

8. A tape cartridge lifting device as claimed in claim 1, wherein said floating mounting of said first threaded nut in said platform includes:
   first walls extending perpendicular of a major plane of said platform and defining a first passageway in which said first threaded nut is disposed;
   first paired tabs extending from said first walls;
   a first split ring engaged between said first paired tabs;
   a circumferential channel on said first threaded nut in which said first split ring is positioned;
   first restraining projections projecting from said first walls to restrain said first threaded nut;
wherein said floating mounting of said second threaded nut in said platform includes;
   second walls extending perpendicular of said major plane of said platform and defining a second passageway in which said second threaded nut is disposed;
   second paired tabs extending from said second walls;
   a second split ring engaged between said second paired tabs;
   a circumferential channel on said second threaded nut in which said second split ring is positioned;
   second restraining projections projecting from said second walls to restrain said second threaded nut;
wherein said floating mounting of said third threaded nut in said platform includes:
   third walls extending perpendicular of said major plane of said platform and defining a third passageway in which said third threaded nut is disposed;
   third paired tabs extending from said third walls;
   a third split ring engaged between said third paired tabs; and
   a circumferential channel on said third threaded nut in which said third split ring is positioned.

9. A tape cartridge lifting device as claimed in claim 8, wherein said first, second and third threaded nuts include radially extending projections and wherein said first and second restraining projections engage said radially extending projections of said first and second threaded nuts, respectively.

10. A tape cartridge lifting device comprising:
   a platform for supporting a tape cartridge, said platform defining three nut receiving openings;
   three threaded nuts in respective ones of said three nut receiving openings;
   floating mountings suspending respective ones of said three threaded nuts in said three nut receiving openings, said floating mountings including spring portions engaged between respective ones of said three nut receiving openings and said three threaded nuts;
   three threaded shafts engaged in said three threaded nuts;
   a drive connected to at least one of said three threaded shafts to rotate said shafts and thereby lift said platform
   wherein said floating mountings restricts rotation of at least one of said three threaded nuts in said platform;
   wherein said floating mountings include:
      first restraining portions in a first of said three nut receiving openings to substantially restrain a first of said three threaded nuts from linear and rotational movement in said first nut receiving opening; and
      second restraining portions in a second of said three nut receiving openings to substantially restrain a second of said three threaded nuts from rotational movement.

* * * * *